United States Patent
Lee et al.

(10) Patent No.: US 11,417,070 B2
(45) Date of Patent: Aug. 16, 2022

(54) AUGMENTED AND VIRTUAL REALITY OBJECT CREATION

(71) Applicant: Lenovo (Singapore) Pte. Ltd., Singapore (SG)

(72) Inventors: Jonathan Co Lee, Cary, NC (US); Scott Wentao Li, Cary, NC (US); Jonathan Jen-Wei Yu, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 16/658,687

(22) Filed: Oct. 21, 2019

(65) Prior Publication Data

US 2021/0118240 A1 Apr. 22, 2021

(51) Int. Cl.
| | |
|---|---|
| *G06T 19/20* | (2011.01) |
| *G06T 15/04* | (2011.01) |
| *G06F 16/54* | (2019.01) |
| *G06V 20/64* | (2022.01) |
| *G06F 3/0482* | (2013.01) |

(52) U.S. Cl.
CPC .............. *G06T 19/20* (2013.01); *G06F 16/54* (2019.01); *G06T 15/04* (2013.01); *G06V 20/64* (2022.01); *G06F 3/0482* (2013.01); *G06T 2200/24* (2013.01); *G06T 2219/2021* (2013.01)

(58) Field of Classification Search
CPC ....... G06T 19/006; G06T 19/20; G06T 15/04; G06T 2200/24; G06T 2219/2021; G06F 16/54; G06F 3/0482; G06K 9/00201; G06K 9/00214; G06K 9/00671; G06V 20/20
See application file for complete search history.

(56) References Cited

U.S. PATENT DOCUMENTS

| | | | | |
|---|---|---|---|---|
| 8,803,912 | B1* | 8/2014 | Fouts | G06T 19/006 |
| | | | | 345/629 |
| 10,192,115 | B1* | 1/2019 | Sheffield | G06T 7/75 |
| 2014/0152698 | A1* | 6/2014 | Kim | G06F 3/04815 |
| | | | | 345/633 |
| 2015/0302027 | A1* | 10/2015 | Wnuk | G06F 16/5854 |
| | | | | 382/305 |
| 2015/0369593 | A1* | 12/2015 | Myllykoski | G06T 7/62 |
| | | | | 348/136 |
| 2016/0092732 | A1* | 3/2016 | Black | G06T 11/60 |
| | | | | 382/103 |
| 2016/0292507 | A1* | 10/2016 | Ghoson | G06K 9/22 |

(Continued)

OTHER PUBLICATIONS

Kholgade, Natasha, et al. "3D object manipulation in a single photograph using stock 3D models." ACM Transactions on Graphics (TOG) 33.4 (2014): 1-12. (Year: 2014).*

*Primary Examiner* — Daniel F Hajnik
(74) *Attorney, Agent, or Firm* — Ference & Associates LLC

(57) ABSTRACT

One embodiment provides a method, including: receiving, at an information handling device, an indication to activate a camera integrated into the information handling device; obtaining, using the activated camera, two-dimensional image data of an object; transforming the two-dimensional image data of the object into three-dimensional image data of the object; and utilizing the three-dimensional image data of the object in at least one of: an augmented reality application and a virtual reality application. Other aspects are described and claimed.

20 Claims, 3 Drawing Sheets

(56) References Cited

U.S. PATENT DOCUMENTS

| | | | |
|---|---|---|---|
| 2017/0365102 A1* | 12/2017 | Huston | H04N 5/23238 |
| 2018/0143693 A1* | 5/2018 | Calabrese | G06F 3/017 |
| 2018/0247431 A1* | 8/2018 | Clark | G06K 9/2063 |
| 2019/0147221 A1* | 5/2019 | Grabner | G06T 19/006 |
| | | | 382/103 |
| 2020/0089954 A1* | 3/2020 | Zia | G06K 9/00671 |

* cited by examiner

AUGMENTED AND VIRTUAL REALITY OBJECT CREATION

BACKGROUND

As technology has progressed, augmented reality ("AR") and/or virtual reality ("VR") technology has become prevalent in a variety of different types of information handling devices ("devices"), for example, smart phones, tablets, wearable devices (e.g., head mounted devices such as AR/VR glasses or headsets, etc.), and the like. Common applications for this technology include gaming, information presentation, application interaction, enhanced object visualization, etc.

BRIEF SUMMARY

In summary, one aspect provides a method, comprising: receiving, at an information handling device, an indication to activate a camera integrated into the information handling device; obtaining, using the activated camera, two-dimensional image data of an object; transforming the two-dimensional image data of the object into three-dimensional image data of the object; and utilizing the three-dimensional image data of the object in at least one of: an augmented reality application and a virtual reality application.

Another aspect provides an information handling device, comprising: a camera; a processor; a memory device that stores instructions executable by the processor to: receive an indication to activate the camera; obtain, using the activated camera, two-dimensional image data of an object; transform the two-dimensional image data of the object into three-dimensional image data of the object; and utilize the three-dimensional image data of the object in at least one of: an augmented reality application and a virtual reality application.

A further aspect provides a product, comprising: a storage device that stores code, the code being executable by a processor and comprising: code that receives an indication to activate a camera; code that obtains two-dimensional image data of an object using the activated camera; code that transforms the two-dimensional image data of the object into three-dimensional image of the object; and code that utilizes the three-dimensional image data of the object in at least one of: an augmented reality application and a virtual reality application.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Conventional processes for creating AR and/or VR content are relatively complex and require the know-how of very skilled individuals. For example, specialized designers and/or engineers often need weeks or months to design, engineer, and release AR/VR content. Additionally, the creation of this content may require the use of advanced machinery, which may be very expensive. Consequently, the aforementioned technical skills and hardware requirements create a high barrier to entry for ordinary individuals that may be interested in creating their own AR/VR content.

Accordingly, an embodiment utilizes pre-existing hardware and software technologies that are readily accessible to most users to transform everyday objects into AR/VR content. In an embodiment, an indication to activate a camera integrated into a user's device (e.g., smart phone, tablet, etc.) may be received. An embodiment may then capture one or more images of an object, thereby creating two-dimensional image data. Thereafter, the two-dimensional image of the object may be transformed into a three-dimensional image, which may be utilized in an AR or VR application. Such a method may easily allow user with devices to create their own AR/VR content using virtually any type of surrounding real world object.

The illustrated example embodiments will be best understood by reference to the figures. The following description is intended only by way of example, and simply illustrates certain example embodiments.

Figure 1:
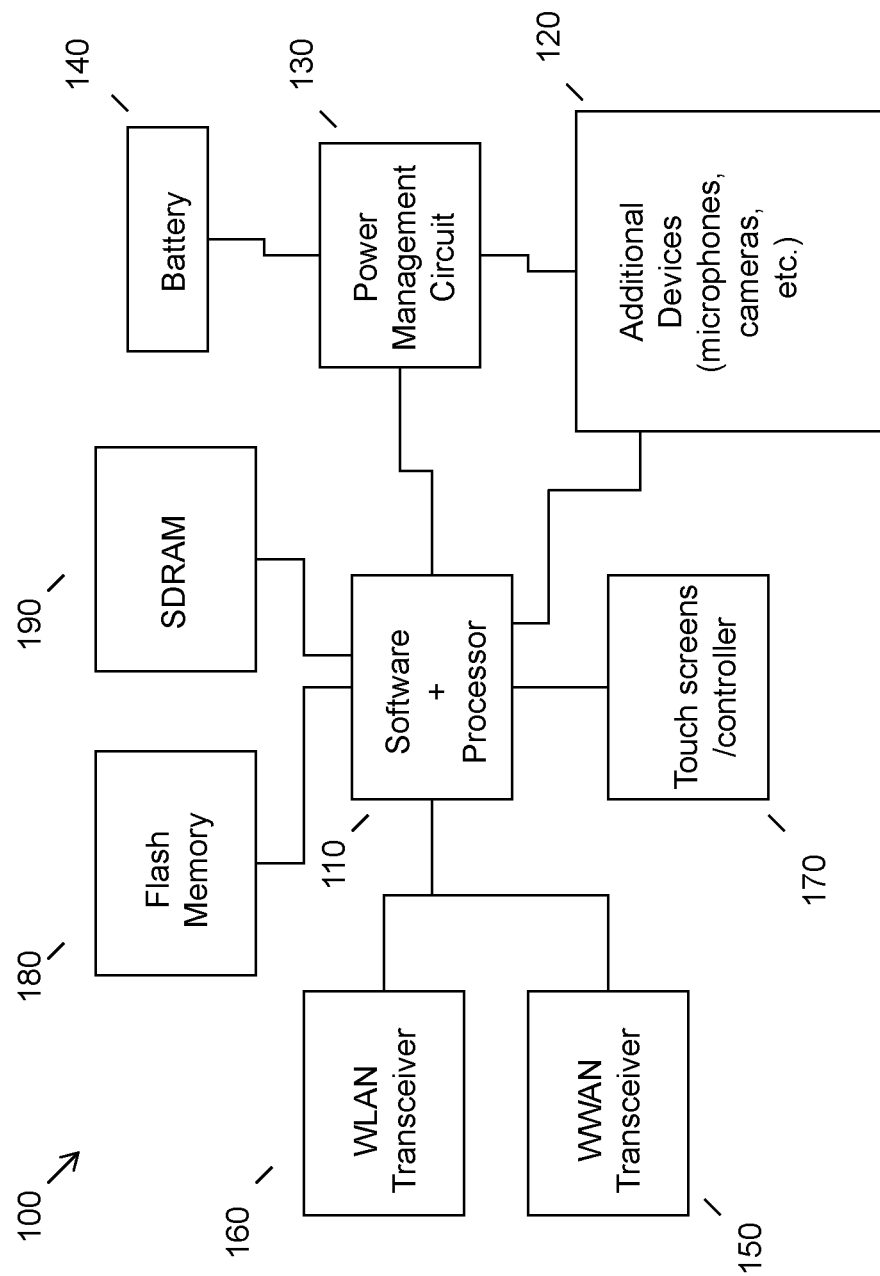
FIG. 1 illustrates an example of information handling device circuitry.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., an image sensor such as a camera, audio capture device such as a microphone, etc. System 100 often includes one or more touch screens 170 for data input and display/rendering. System 100 also typically includes various memory devices, for example flash memory 180 and SDRAM 190.

Figure 2:
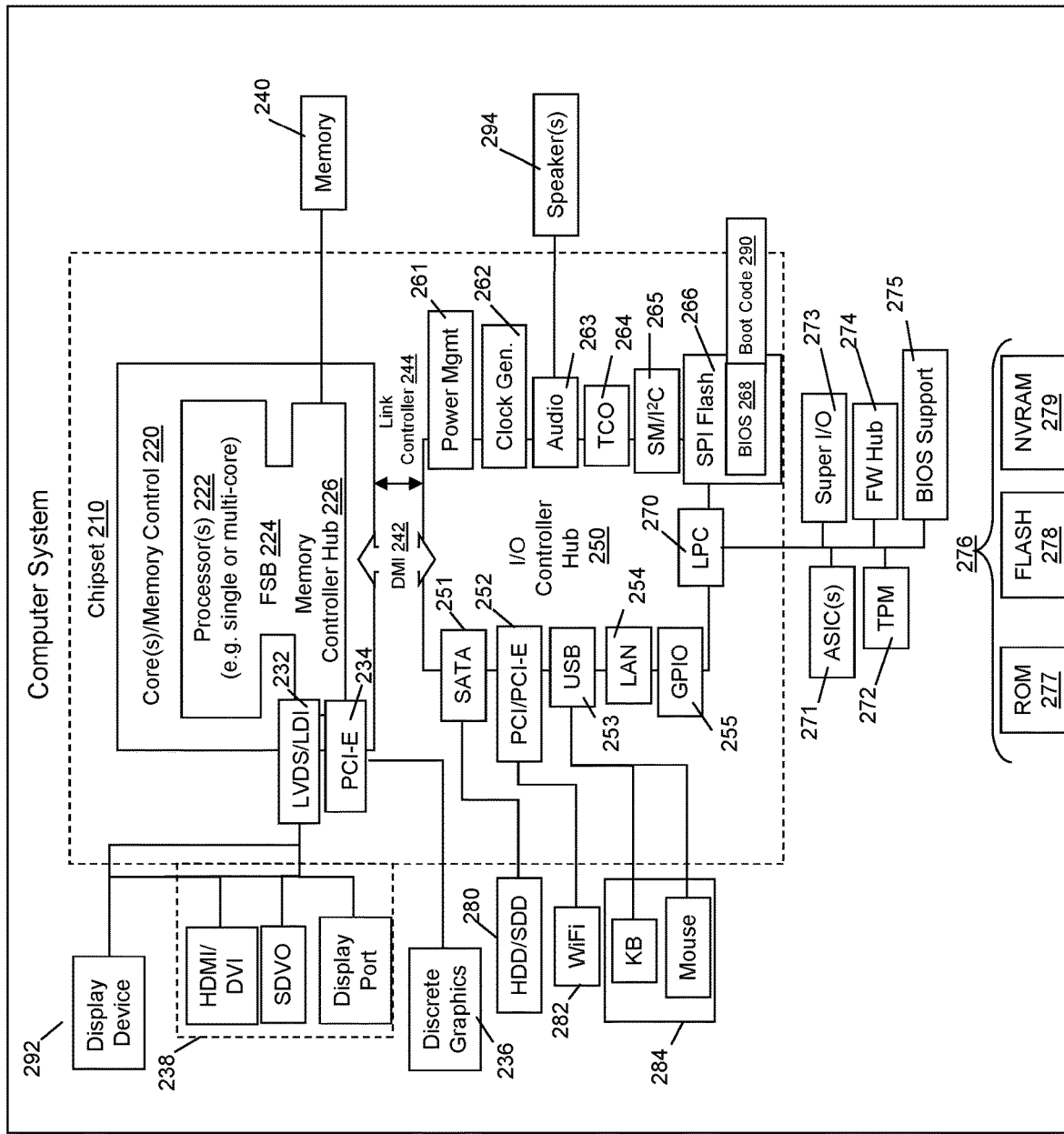
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices having augmented reality capabilities and having at least one display. For example, the circuitry outlined in FIG. 1 may be implemented in an augmented reality headset embodiment, whereas the circuitry outlined in FIG. 2 may be implemented in a smart phone.

Figure 3:
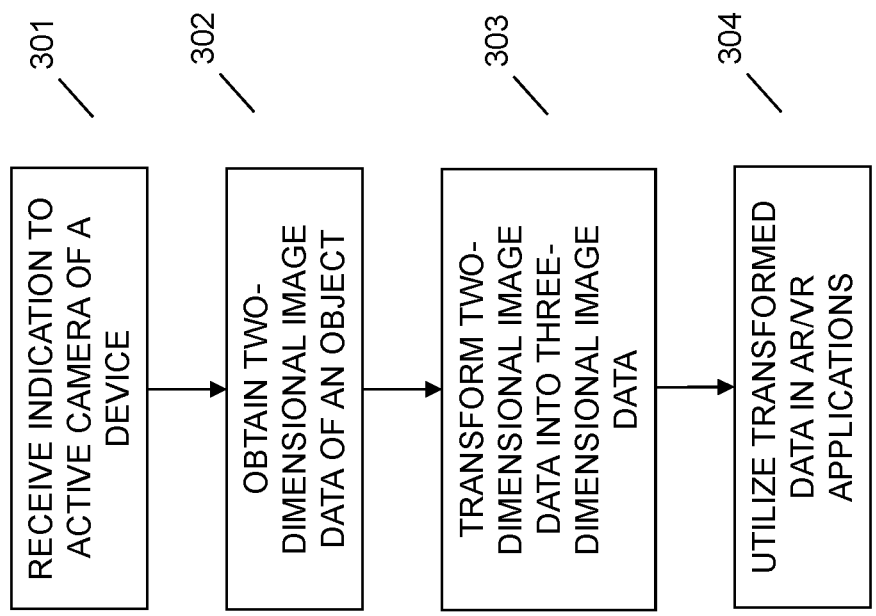
FIG. 3 illustrates an example method of transforming two-dimensional objects into three-dimensional objects for augmented and/or virtual reality use.

Referring now to FIG. 3, an embodiment may transform two-dimensional images into three-dimensional images that may thereafter be used in one or more AR/VR applications. At 301, an embodiment may receive an indication to activate a camera integrated into a device. The indication may be derived from receipt of camera activation input from a user (e.g., press input directed to a physical or virtual camera activation button, audible camera activation command captured by a microphone, etc.). Additionally or alternatively, a camera of the device may dynamically activate responsive to detecting that a certain application is activated (e.g., an AR/VR object creation application, etc.).

At 302, an embodiment may utilize the camera to capture one or more two-dimensional images of an object. In an embodiment, the object may be virtually any object in the user's proximate area that can be photographed. In an embodiment, the two-dimensional image(s) may be captured by utilizing a panning technique. More particularly, as an example, a user may open an AR/VR object creation application that may instruct the user to pan around the desired object (e.g., similar to panning a camera for a panoramic photograph, etc.). As another example, a user may open an AR/VR object creation application that may instruct the user to take two or more orthographic images of the object (e.g., a top image, a side image, a bottom image, etc.). In an embodiment, a combination of the foregoing two-dimensional image capturing techniques may also be utilized.

At 303, an embodiment may transform the two-dimensional image data of the object into three-dimensional image data that is ready for AR/VR use. A plurality of transformation methods are described below. Each of the following transformation methods may be utilized alone or in combination with one another.

In an embodiment, the two-dimensional image data may be translated to three-dimensional image data via an object recognition technique. More particularly, the real-world objects in the captured two-dimensional image(s) may first be dynamically identified using one or more conventional image analysis or object recognition techniques. Thereafter, one or more images of stock objects, determined to be related to the real-world object, may be presented to a user that they may choose from (i.e., the user may choose the stock image that is most closely related to the object). Subsequent to the selection, the entirety of the stock object (i.e., structure and appearance of the stock object), or just the structure and/or the dimensions of the stock object, may be used as a baseline for AR/VR object creation. As a non-limiting, practical example of the foregoing concepts, a user may attempt to virtualize a shampoo bottle. After capturing a plurality of views of the shampoo bottle, an embodiment may recognize the object and present the user with a plurality of images of stock shampoo bottles. A user may thereafter select the stock image that most closely resembles the real-world shampoo bottle they are attempting to virtualize. The user may choose to select the entirety of the stock shampoo bottle (e.g., the bottle structure and the designs and/or logos resident on it, etc.) or may choose to simply select the underlying structure of the stock shampoo bottle.

In a similar embodiment to the foregoing, the two-dimensional image data may be translated into a three-dimensional generic shape. More particularly, a user may select a generic shape (e.g., a regular shape such as a square, cone, cylinder, etc.; a generic animal shape; a generic object shape, etc.) from a shapes library (i.e., that is stored locally on the device or stored remotely on another device or server but accessible by the device). An embodiment may thereafter map the captured image data of the real-world object on the shape. As a non-limiting, practical example of the foregoing concepts, a user may initially capture a plurality of perspective images of a book. A user may thereafter select, from an available shapes library, a generic shape of a book. An embodiment may thereafter map the designs and visual details of the real-world book jacket onto the generic book shape.

In an embodiment, with respect to the foregoing embodiments, sculpting/editing inputs may further be provided by the user on any selected stock or generic object. More particularly, the user may adjust the dimensional characteristics of the stock object by using a digital sculpting tool (e.g., by pulling or pushing the edges of the stock object, by adding or removing aspects to or from the stock object, etc.) or may adjust the visual designs on the stock object (e.g., the color of the stock object, the designs resident on the stock object, etc.). Such an embodiment may be useful where the mapping of the two-dimensional image onto the stock object was not completely accurate.

In an embodiment, if an object cannot be found through one of the foregoing processes, the user may create a three-dimensional object from scratch. More particularly, a user may input object dimensions into an AR/VR object construction application. Additionally or alternatively, a user may select a generic shape from the aforementioned shapes library and thereafter provide additional editing inputs to it until a desired shape is achieved.

In an embodiment, the aforementioned shapes library and/or list of stock objects may be further enriched or modified by the presence of additional context data. More particularly, potential context data types that may be obtained and utilized to prioritize certain shapes and/or objects include location data associated with a user's current position, generic location designation data (e.g., office, bedroom, etc.), user occupation data (e.g., from a user profile, etc.), user activity data (e.g., from available calendar data, etc.), and the like. As a non-limiting, practical example of the foregoing, a user may want to construct a virtual reproduction of their office or work space. An embodiment may identify a user's occupation (e.g., a doctor, etc.) and thereafter prioritize and/or present a plurality of objects that are common to many doctor's offices (e.g., computer monitors, medical instruments, etc.). In another example, an embodiment may identify that a user is currently standing in a public park. Accordingly, an embodiment may prioritize and/or suggest a plurality of objects that are common to conventional public parks (e.g., trees, benches, etc.), or, alternatively, may suggest objects that are common to the specific public park the user is located at (e.g., a known landmark in the park, etc.).

At 304, an embodiment may utilize the transformed three-dimensional image data of the object in an AR application, a VR application, or both. A user may interact with and/or manipulate their created object in the AR or VR world in the same way that they would interact with another type of AR or VR object.

Embodiments of the foregoing may allow for life-size reproductions of conventionally miniature objects. For example, an architect may transform images of a tangible miniature model constructed of paper and glue into three-dimensional image data. The architect may thereafter scale that three-dimensional object (e.g., via provision of editing inputs, etc.) into a life-size environment that may enable them to add finer design adjustments to the object.

In an embodiment, data associated with the dimensions, visual appearance, and/or AR/VR locations of each created object by any user of the AR/VR object creation application may be stored in an advanced "crowdsourced" library. Such a library may be referenced when a user attempts to create AR/VR objects. For example, a user attempting to create an AR production of a conventional business office may access the advanced crowdsourced library to identify the types of objects other users used to populate similar spaces (e.g., desks, computer monitors, staplers, notepads, etc.).

The various embodiments described herein thus represent a technical improvement to conventional methods for creating AR/VR content. Using the techniques described herein, an embodiment may receive an indication to activate a camera of a user's device (e.g., smart phone, tablet, etc.). An embodiment may then obtain two-dimensional image data of an object and thereafter transform (e.g., using one or more of the aforementioned transformation techniques, etc.) the two-dimensional data into three-dimensional data. This three-dimensional data may be utilized in one or more AR or VR applications. Such a technique may allow for the expansion of users that are able to produce AR/VR content.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, a system, apparatus, or device (e.g., an electronic, magnetic, optical, electromagnetic, infrared, or semiconductor system, apparatus, or device) or any suitable combination of the foregoing. More specific examples of a storage device/medium include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
   receiving, at an information handling device, an indication to activate a camera integrated into the information handling device;
   obtaining, using the activated camera, two-dimensional image data of an object, wherein the two-dimensional image data comprises at least one design resident on a portion of the object;
   transforming the two-dimensional image data of the object into three-dimensional image data of the object, wherein the transforming comprises:
      determining, using at least one image analysis technique, an identity of the object;
      identifying, in a stock object library, at least one stock object determined to be associated with the identified object;
      obtaining context data associated with a user of the information handling device, wherein the context data comprises a generic location designation data of the user, wherein the generic location designation data represents a type of space;
      modifying an aspect of the at least one stock object based on the context data, wherein the modifying comprises prioritizing the at least one stock object associated with the type of space using the generic location designation data;
      incorporating a structure of the at least one stock object with the modified aspect into the three-dimensional image data; and
      applying a copy of the at least one design to a portion of the at least one stock object corresponding to the portion of the object wherein the at least one design resides; and
   utilizing the three-dimensional image data of the object in at least one of: an augmented reality application and a virtual reality application.

2. The method of claim 1, wherein the obtaining the two-dimensional image data comprises obtaining the two-dimensional image data via a panning technique.

3. The method of claim 1, wherein the obtaining the two-dimensional image data comprises obtaining the two-dimensional image data via an orthographic image gathering technique.

4. The method of claim 1, wherein the transforming comprises transforming using an object recognition technique.

5. The method of claim 4, further comprising receiving, from a user, a selection of one of the at least one stock object.

6. The method of claim 1, wherein the transforming comprises:
   receiving, from a user, a shape selection from a shapes library; and
   mapping, based on the shape selection, the two-dimensional image data onto a shape corresponding to the shape selection.

7. The method of claim 1, wherein the transforming comprises:
   receiving, from a user, object construction input; and
   mapping, based on the object construction input, the two-dimensional image data onto a construction object resulting from the object construction input.

8. The method of claim 1, wherein the transforming comprises:
   receiving object location data;
   displaying, on a display associated with the information handling device, a list of objects known to be associated with the object location data;
   receiving, from a user, an object selection from the list of objects; and mapping, based on the object selection, the two-dimensional data onto an object corresponding to the object selection.

9. The method of claim 8, wherein the list of objects is at least partially dependent on one of: an occupation of the user or an activity engaged in by the user.

10. The method of claim 1, further comprising adding the three-dimensional image data of the object into an advanced crowdsourced library that is accessible by other users.

11. An information handling device, comprising:
a camera;
a processor;
a memory device that stores instructions executable by the processor to:
receive an indication to activate the camera;
obtain, using the activated camera, two-dimensional image data of an object, wherein the two-dimensional image data comprises at least one design resident on a portion of the object;
transform the two-dimensional image data of the object into three-dimensional image data of the object, wherein the instructions executable by the processor to transform comprise instructions executable by the processor to:
determine, using at least one image analysis technique, an identity of the object;
identify, in a stock object library, at least one stock object determined to be associated with the identified object;
obtain context data associated with a user of the information handling device, wherein the context data comprises a generic location designation data of the user, wherein the generic location designation data represents a type of space;
modify an aspect of the at least one stock object based on the context data, wherein the modifying comprises prioritizing the at least one stock object associated with the type of space using the generic location designation data;
incorporate a structure of the at least one stock object with the modified aspect into the three-dimensional image data; and
apply a copy of the at least one design to a portion of the at least one stock object to the portion of the object wherein the at least one design resides; and
utilize the three-dimensional image data of the object in at least one of: an augmented reality application and a virtual reality application.

12. The information handling device of claim 11, wherein the instructions executable by the processor to obtain the two-dimensional image data comprise instructions executable by the processor to obtain the two-dimensional image data via a panning technique.

13. The information handling device of claim 11, wherein the instructions executable by the processor to obtain the two-dimensional image data comprise instructions executable by the processor to obtain the two-dimensional image data via an orthographic image gathering technique.

14. The information handling device of claim 11, wherein the instructions executable by the processor to transform comprise instructions executable by the processor to transform using an object recognition technique.

15. The information handling device of claim 14, wherein the instructions are further executable by the processor to receive, from a user, a selection of one of the at least one stock object.

16. The information handling device of claim 11, wherein the instructions executable by the processor to transform comprise instructions executable by the processor to:
receive, from a user, a shape selection from a shapes library; and
map, based on the shape selection, the two-dimensional image data onto a shape corresponding to the shape selection.

17. The information handling device of claim 11, wherein the instructions executable by the processor to transform comprise instructions executable by the processor to:
receive, from a user, object construction input; and
map, based on the object construction input, the two-dimensional image data onto a construction object resulting from the object construction input.

18. The information handling device of claim 11, wherein the instructions executable by the processor to transform comprise instructions executable by the processor to:
receive object location data;
display, on a display associated with the information handling device, a list of objects known to be associated with the object location data;
receive, from a user, an object selection from the list of objects; and
map, based on the object selection, the two-dimensional data onto an object corresponding to the object selection.

19. The information handling device of claim 11, wherein the instructions are further executable by the processor to add the three-dimensional image data of the object into an advanced crowdsourced library that is accessible by other users.

20. A product, comprising:
a storage device that stores code, the code being executable by a processor and comprising:
code that receives an indication to activate a camera;
code that obtains two-dimensional image data of an object using the activated camera, wherein the two-dimensional image data comprises at least one design resident on a portion of the object;
code that transforms the two-dimensional image data of the object into three-dimensional image of the object, wherein the code that transforms comprises:
code that determines, using at least one image analysis technique, an identity of the object;
code that identifies, in a stock object library, at least one stock object determined to be associated with the identified object;
code that obtains context data associated with a user, wherein the context data comprises a generic location designation data of the user, wherein the generic location designation data represents a type of space;
code that modifies an aspect of the at least one stock object based on the context data, wherein the modifying comprises prioritizing the at least one stock object associated with the type of space using the generic location designation data;
code that incorporates a structure of the at least one stock object with the modified aspect into the three-dimensional image data; and
code that applies a copy of the at least one design to a portion of the at least one stock object corresponding to the portion of the object wherein the at least one design resides; and code that utilizes the three-dimensional image data of the object in at least one of: an augmented reality application and a virtual reality application.

\* \* \* \* \*